(12) United States Patent
Pleiman

(10) Patent No.: US 11,290,790 B2
(45) Date of Patent: *Mar. 29, 2022

(54) WAGER INFORMATION BASED PRIORITIZED LIVE EVENT DISPLAY SYSTEM

(71) Applicant: DISH Network L.L.C., Englewood, CO (US)

(72) Inventor: Eric Pleiman, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,563

(22) Filed: Nov. 20, 2020

(65) Prior Publication Data

US 2021/0076103 A1      Mar. 11, 2021

Related U.S. Application Data

(63) Continuation of application No. 16/234,902, filed on Dec. 28, 2018, now Pat. No. 10,848,836.

(51) Int. Cl.
*H04N 5/445*      (2011.01)
*H04N 21/81*      (2011.01)
(Continued)

(52) U.S. Cl.
CPC ..... *H04N 21/8126* (2013.01); *G07F 17/3223* (2013.01); *G07F 17/3225* (2013.01); *G07F 17/3288* (2013.01); *H04N 21/2187* (2013.01); *H04N 21/4312* (2013.01); *H04N 21/4545* (2013.01); *H04N 21/4821* (2013.01)

(58) Field of Classification Search
CPC ......... H04N 21/8126; H04N 21/4821; H04N 21/2187; H04N 21/4545; H04N 21/4312; H04N 21/26225; H04N 21/25866; H04N 21/2668; H04N 21/4781
See application file for complete search history.

(56) References Cited

U.S. PATENT DOCUMENTS 7,603,683 B2 * 10/2009 Reto ................... H04N 21/4622
                                                                          725/34
8,307,395 B2 * 11/2012 Issa ...................... H04N 21/435
                                                                          725/46
(Continued)

*Primary Examiner* — Michael B. Pierorazio
(74) *Attorney, Agent, or Firm* — Perkins Coie LLP

(57) ABSTRACT

A system for automatically selecting television channels based on wager information can include a set-top box, wager databases having user wager information, broadcast databases having broadcast schedule information, and a controller. The wager information can include an event identifier and a corresponding wager amount. The broadcast schedule can include a channel, a start time, and an end time for each event. The controller can include processors and memory devices having instructions that cause the processors to obtain wager information for the user from the wager databases, match each event identifier and corresponding wager amount to the broadcast schedule, determine a set of live events by comparing a current time with the start time and end time for each event, prioritize the live events based on wager amount, and send an instruction to the set-top box to display the channel corresponding to each live event in order of priority.

20 Claims, 8 Drawing Sheets

| Event | Bet ($) | Start | End | Duration (H) | Channel |
|---|---|---|---|---|---|
| Football | 500 | 10:00 AM | 2:00 PM | 4 | 200 |
| Basketball | 200 | 12:00 PM | 3:00 PM | 3 | 500 |
| Tennis | 400 | 1:00 PM | 4:00 PM | 3 | 300 |
| Soccer | 300 | 1:00 PM | 5:00 PM | 4 | 600 |
| Golf | 100 | 1:00 PM | 3:00 PM | 2 | 700 |

(51) Int. Cl.
*H04N 21/482* (2011.01)
*H04N 21/2187* (2011.01)
*G07F 17/32* (2006.01)
*H04N 21/4545* (2011.01)
*H04N 21/431* (2011.01)

(56) References Cited

U.S. PATENT DOCUMENTS

| | | | | |
|---|---|---|---|---|
| 9,053,129 B1* | 6/2015 | Covell | ............... | G06Q 30/0241 |
| 2002/0091564 A1* | 7/2002 | Geller | ................... | G06Q 99/00 |
| | | | | 705/12 |
| 2004/0008220 A1* | 1/2004 | Snyder | ................... | H04N 5/262 |
| | | | | 715/716 |
| 2004/0117831 A1* | 6/2004 | Ellis | ..................... | H04N 21/485 |
| | | | | 725/53 |
| 2005/0262542 A1* | 11/2005 | DeWeese | ............... | H04N 21/454 |
| | | | | 725/106 |
| 2005/0273830 A1* | 12/2005 | Silver | ................... | H04N 21/435 |
| | | | | 725/105 |
| 2006/0184967 A1* | 8/2006 | Maynard | .............. | H04N 21/466 |
| | | | | 725/46 |
| 2006/0190966 A1* | 8/2006 | McKissick | ......... | H04N 21/2543 |
| | | | | 725/61 |
| 2007/0011702 A1* | 1/2007 | Vaysman | ............ | H04N 21/4532 |
| | | | | 725/45 |
| 2007/0072543 A1* | 3/2007 | Paila | .................. | H04N 21/8543 |
| | | | | 455/3.06 |
| 2007/0124756 A1* | 5/2007 | Covell | ............... | H04N 21/8106 |
| | | | | 725/18 |
| 2008/0051026 A1* | 2/2008 | Kim | ..................... | H04W 72/005 |
| | | | | 455/3.01 |
| 2008/0065507 A1* | 3/2008 | Morrison | ............ | H04L 65/4076 |
| | | | | 705/26.3 |
| 2008/0092199 A1* | 4/2008 | McCarthy | ......... | H04N 21/26291 |
| | | | | 725/133 |
| 2008/0146342 A1* | 6/2008 | Harvey | ................ | A63F 13/352 |
| | | | | 463/42 |
| 2008/0194334 A1* | 8/2008 | Kuok | .................. | G07F 17/3262 |
| | | | | 463/42 |
| 2009/0100469 A1* | 4/2009 | Conradt | ............. | H04N 21/4668 |
| | | | | 725/46 |
| 2009/0292376 A1* | 11/2009 | Kazem | ............. | H04N 21/26258 |
| | | | | 700/94 |
| 2009/0319601 A1* | 12/2009 | Zvonaric | ............ | H04N 21/4756 |
| | | | | 709/203 |
| 2010/0070999 A1* | 3/2010 | Morris | ............... | H04N 21/4756 |
| | | | | 725/39 |
| 2010/0131385 A1* | 5/2010 | Harrang | ............. | G06Q 30/0277 |
| | | | | 705/26.1 |
| 2010/0185507 A1* | 7/2010 | Tokuda | .............. | G06Q 30/0269 |
| | | | | 705/14.41 |
| 2011/0004692 A1* | 1/2011 | Occhino | ................ | H04L 67/16 |
| | | | | 709/228 |
| 2011/0055309 A1* | 3/2011 | Gibor | .................... | H04L 69/18 |
| | | | | 709/202 |
| 2011/0107220 A1* | 5/2011 | Perlman | ............... | H04N 19/166 |
| | | | | 715/720 |
| 2011/0126257 A1* | 5/2011 | Goergen | ............. | H04N 21/4316 |
| | | | | 725/132 |
| 2011/0216153 A1* | 9/2011 | Tasker | ................... | H04N 7/148 |
| | | | | 348/14.02 |
| 2011/0237318 A1* | 9/2011 | Sama | .................... | A63F 13/335 |
| | | | | 463/9 |
| 2012/0094737 A1* | 4/2012 | Barclay | ................... | G07F 17/34 |
| | | | | 463/20 |
| 2012/0120183 A1* | 5/2012 | Gagneraud | .......... | H04N 13/239 |
| | | | | 348/14.08 |
| 2012/0137316 A1* | 5/2012 | Elizarov | ............... | H04N 21/24 |
| | | | | 725/9 |
| 2012/0158852 A1* | 6/2012 | Goldsmith | ............. | G06Q 10/10 |
| | | | | 709/205 |
| 2012/0169836 A1* | 7/2012 | Setlur | ................. | H04L 12/1827 |
| | | | | 348/14.11 |
| 2012/0172117 A1* | 7/2012 | Doorgeest | ............ | A63F 3/0645 |
| | | | | 463/31 |
| 2013/0136425 A1* | 5/2013 | Herby | ................ | H04N 21/2668 |
| | | | | 386/296 |
| 2014/0067828 A1* | 3/2014 | Archibong | ........ | G06F 17/30277 |
| | | | | 707/748 |
| 2015/0039418 A1* | 2/2015 | Baluja | ................ | G06Q 30/0246 |
| | | | | 705/14.45 |

* cited by examiner

| Event | Bet ($) | Start | End | Duration (H) | Channel |
|---|---|---|---|---|---|
| Football | 500 | 10:00 AM | 2:00 PM | 4 | 200 |
| Basketball | 200 | 12:00 PM | 3:00 PM | 3 | 500 |
| Tennis | 400 | 1:00 PM | 4:00 PM | 3 | 300 |
| Soccer | 300 | 1:00 PM | 5:00 PM | 4 | 600 |
| Golf | 100 | 1:00 PM | 3:00 PM | 2 | 700 |

WAGER INFORMATION BASED PRIORITIZED LIVE EVENT DISPLAY SYSTEM

CROSS-REFERENCE TO RELATED APPLICATIONS

This application is a continuation of U.S. patent application Ser. No. 16/234,902, filed Dec. 28, 2018, entitled "WAGER INFORMATION BASED PRIORITIZED LIVE EVENT DISPLAY SYSTEM,", which is related to U.S. patent application Ser. No. 15/963,494, filed Apr. 26, 2018, entitled "Sports Bar Mode Automatic Viewing Determination" and U.S. patent application Ser. No. 15/218,321, filed Jul. 25, 2016, entitled "Provider-Defined Live Multichannel Viewing Events," the entire disclosures of which are hereby incorporated by reference for all purposes.

BACKGROUND

Many live events, such as sporting events, are broadcast at the same or overlapping times. For a viewer that is interested in viewing two or more of these events, determining what channel each event is on and switching between those channels can be a frustrating situation. In some cases, it is preferable to record one or more lower priority events for later viewing while watching the live broadcast of the highest priority event. However, in many cases, it is desirable to watch all or most of the events at the same time. For example, as more states adopt legislation to allow on-line sports betting, a viewer in those states can wager on multiple games across different sports, each of which the viewer would like to watch in real time. Unfortunately, many of these games will be broadcast at overlapping times requiring the viewer to manually switch between multiple channels.

SUMMARY

Disclosed herein are methods and systems for automatically selecting and prioritizing television channels for display based on wager information. In some embodiments a method can include obtaining, by a controller, wager information for one or more wagers placed by a user. The wager information can include, for each wager, an event identifier and a corresponding wager amount. The method can further include matching, by the controller, each event identifier and corresponding wager amount to a broadcast schedule, the schedule including a channel, a start time, and an end time for each event identifier. The controller can then determine a set of live events by comparing a current time with the start time and the end time for each event identifier and prioritize the live events based on wager amount. The method can include sending, by the controller, an instruction to display the channel corresponding to each live event in order of priority.

In some embodiments, the method can also include determining an updated set of live events, prioritizing the updated live events by wager amount, and sending a subsequent instruction to display the channel corresponding to each updated live event in order of priority. In some embodiments, the method can also include displaying the live events in order of priority on one or more display devices. In some embodiments, the method can also include outputting a quad video stream that comprises the four channels corresponding to each of the four highest priority live events for display on four quadrants of a display device. The four channels can be displayed in order of priority from a top-left to a lower right quadrant. In some embodiments, the method can also include sending an instruction to output an audio signal for only the channel corresponding to the highest priority live event. In various arrangements, the wager information can be obtained via a user device, one or more third party betting platforms, and/or a set-top box of the user.

In some embodiments, a system for automatically selecting television channels for display based on wager information can include a set-top box associated with a display device, one or more wager databases having wager information for one or more wagers placed by at least one user, one or more broadcast databases having broadcast schedule information, and a controller. The wager information can include, for each wager, an event identifier and a corresponding wager amount. The broadcast schedule information can include a channel, a start time, and an end time for each event identifier. In some arrangements, the controller comprises one or more processors and one or more memory devices. The memory devices can have stored thereon instructions that when executed by the one or more processors cause the one or more processors to obtain wager information for the at least one user from the one or more wager databases, match each event identifier and corresponding wager amount to the broadcast schedule information, determine a set of live events by comparing a current time with the start time and the end time for each event identifier, prioritize the live events based on wager amount, and send an instruction to the set-top box to display the channel corresponding to each live event in order of priority.

In some embodiments, the memory devices can have further instructions to determine an updated set of live events, prioritize the updated live events by wager amount, and send a subsequent instruction to the set-top box to display the channel corresponding to each updated live event in order of priority. The memory devices can also have further instructions to send an instruction to the set-top box to output a quad video stream that comprises the four channels corresponding to each of the four highest priority live events for display on four quadrants of the display device. The memory devices can also have further instructions to send an instruction to the set-top box to output an audio signal for only the channel corresponding to the highest priority live event.

In some embodiments, a processor readable memory device can include instructions stored thereon that when executed by one or more processors, cause the one or more processors to obtain wager information for one or more wagers placed by a user, the wager information including, for each wager, an event identifier and a corresponding wager amount, match each event identifier and corresponding wager amount to a broadcast schedule, the schedule including a channel, a start time, and an end time for each event identifier, determine a set of live events by comparing a current time with the start time and the end time for each event identifier, prioritize the live events based on wager amount, and send an instruction to display the channel corresponding to each live event in order of priority.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
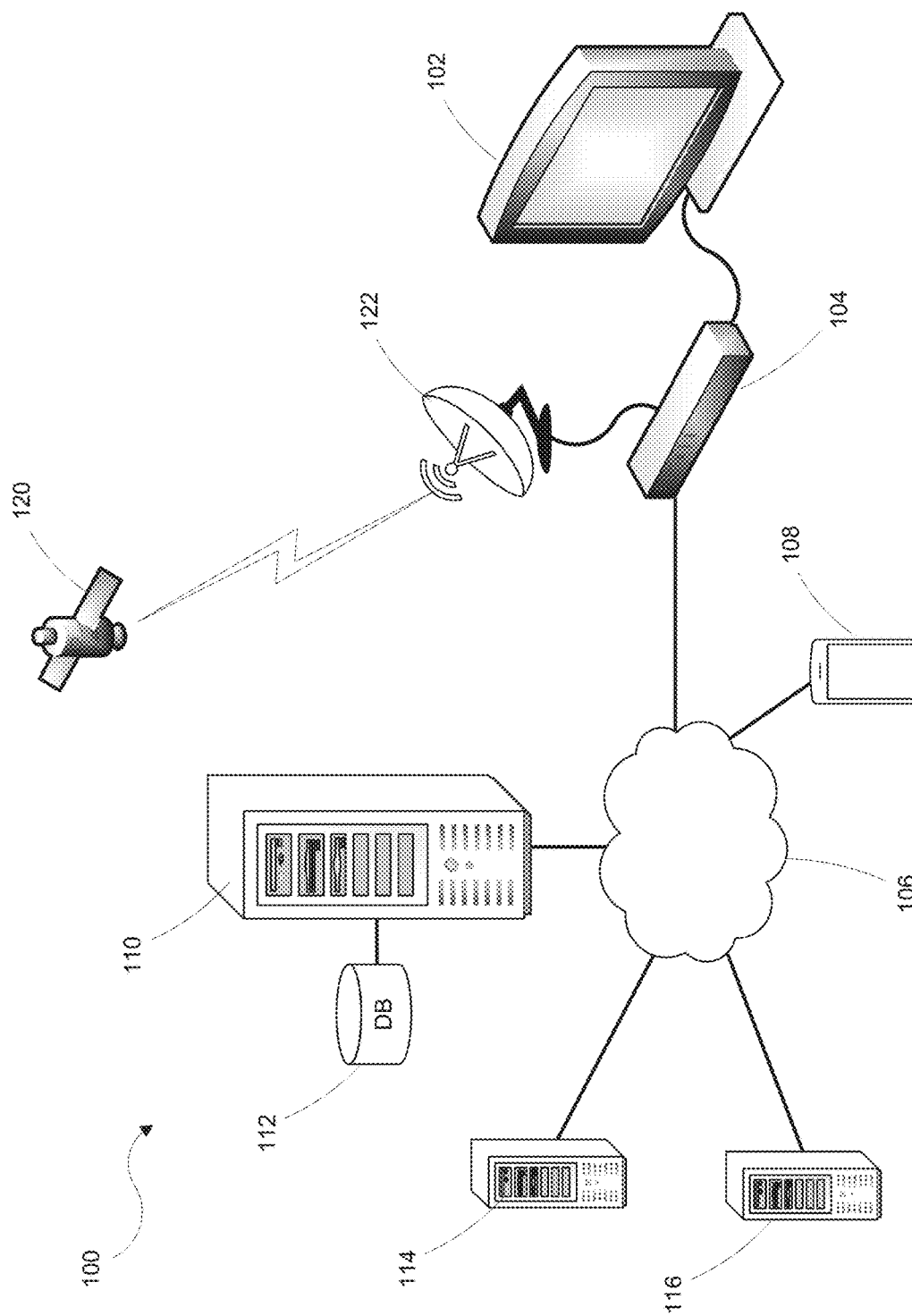
FIG. 1 illustrates an example simplified block diagram of a system for automatically selecting television channels for display based on user wager information.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Many live events, such as sporting events, are broadcast at the same or overlapping times. In many cases, it is desirable to watch all or most of the events at the same time. For example, as more states allow on-line sports betting, a viewer in those states can wager or bet on multiple games across different sports, each of which the viewer would like to watch in real time. Disclosed herein are methods and systems for automatically selecting and prioritizing television channels for display based on wager information. For example, the system can obtain wager information for one or more wagers placed by a user via the user's smart phone, a third party internet betting platform, and/or information input through the user's set-top box or smart phone. The wager information can include an event identifier and a corresponding wager amount for each wager. A controller matches each event identifier and corresponding wager amount to a broadcast schedule including a channel, a start time, and an end time for each event identifier. The controller determines a set of live events by comparing a current time with the start time and the end time for each event identifier. The controller then prioritizes the live events based on wager amount. At that point, the channels corresponding to each live event are displayed in order of priority on a display with e.g., picture-in-picture (PIP), a split screen, a four-way split screen, or multiple separate screens. In some implementations, the set-top box can record the events of interest in response to the prioritization of events. Specifically, any events not displayed live to the user (e.g., due to limits on multichannel viewing) can be recorded for later viewing.

FIG. 1 illustrates an example simplified block diagram of a system 100 for automatically selecting and prioritizing television channels for display based on wager information. The system 100 can include, a television 102, a set-top box (STB) 104, a controller 110, a wager information database 112, and optionally a cloud environment 106. The system 100 can also include or be in communication with one or more third party betting platforms 114 and 116. Optionally, the system 100 can include or be in communication with a user device 108. The user device 108 can be a desktop computer or a mobile device, such as a cellular telephone, a tablet computer, a smartwatch, or any other mobile device. While depicted separately, STB 104 and controller 110 can optionally be combined into a single computer system.

In some examples, the STB 104 can be in communication with a satellite-based television distribution system via a satellite dish 122. Satellite-based television distribution systems often include one or more satellites 120 and satellite transmission equipment (not shown). Although the system is described with respect to satellite-based distribution system, cable, IP- based, wireless, and broadcast focused systems are also possible. While only one satellite dish 122, STB 104, and display device 102 (collectively referred to as "user equipment") are illustrated, it should be understood that multiple (e.g., tens, thousands, millions of) instances and types of user equipment may receive data and television signals from satellite-based television distribution systems (e.g., satellite 120).

Figure 2:
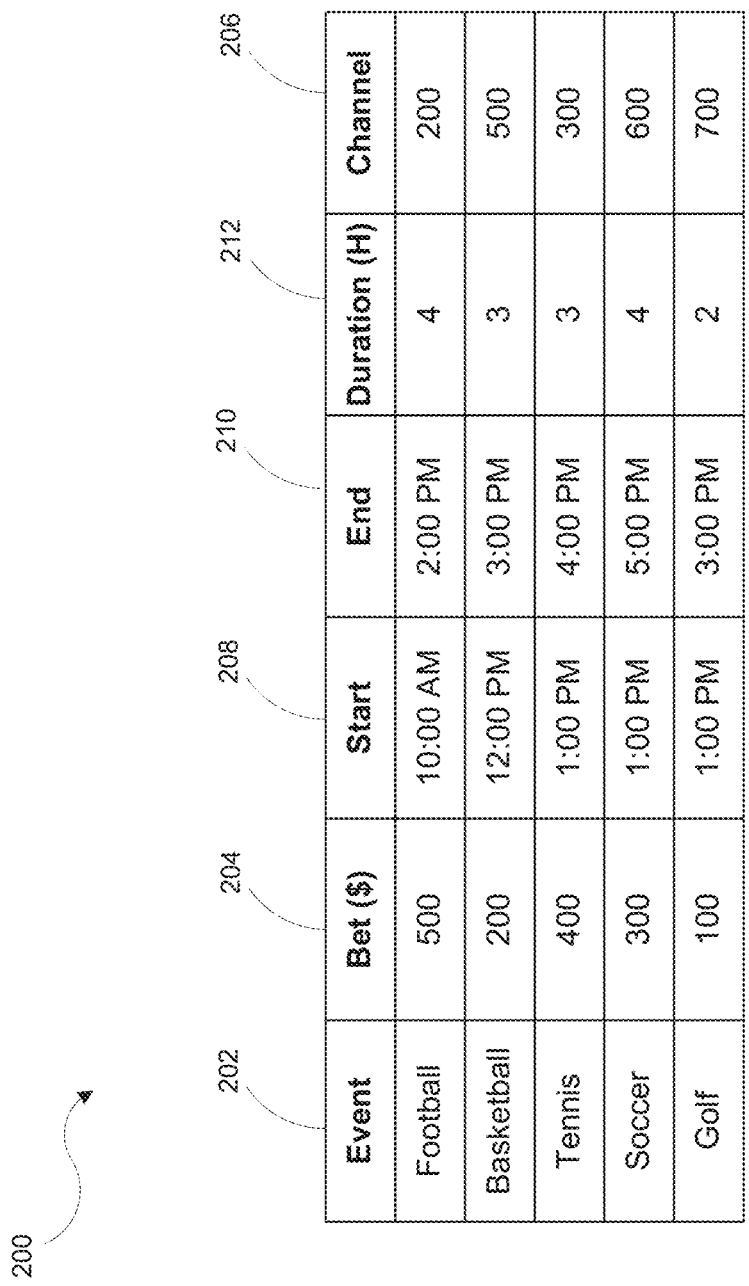
FIG. 2 illustrates a combined television event schedule and associated user wager information table.

FIG. 2 illustrates a table 200 containing television event schedule and associated user wager information. Referring to FIGS. 1 and 2, the controller 110 can obtain wager information for one or more wagers placed by a user. The wager information can include, for each wager, an event identifier 202 and a corresponding wager amount 204. For example, in table 200 the user has wagered, in order of priority, $500 on football, $400 on tennis, $300 on soccer, $200 on basketball, and $100 on golf. The controller 110 matches each event identifier 202 and corresponding wager amount 204 to a broadcast schedule. The broadcast schedule can include e.g., a channel 206, a start time 208, an end time 210, and a duration 212 for each event identifier.

The wager information can be obtained from various sources. For example, the controller 110 can communicate via network 106 to automatically obtain a user's wager information directly from an internet betting website, such as third party betting platforms 114 and/or 116. In some implementations, the wager information is communicated to the controller 110 via an application on the user's remote device 108. In other implementations, the user can manually input the wager information using the remote device 108 and/or the STB 104. In any case, the wager schedule information can be stored on database 112. In some implementations, the user can place one or more wagers via the remote device 108 or via the STB 104. The broadcast schedule information can be obtained from a broadcast database provided by the satellite-based television distribution system via the one or more satellites 120 and/or network 106. The broadcast schedule information can be stored on the STB 104 and transferred to database 112 or the information can be directly obtained from the satellite-based television distribution system for storage on database 112.

Figure 3A:
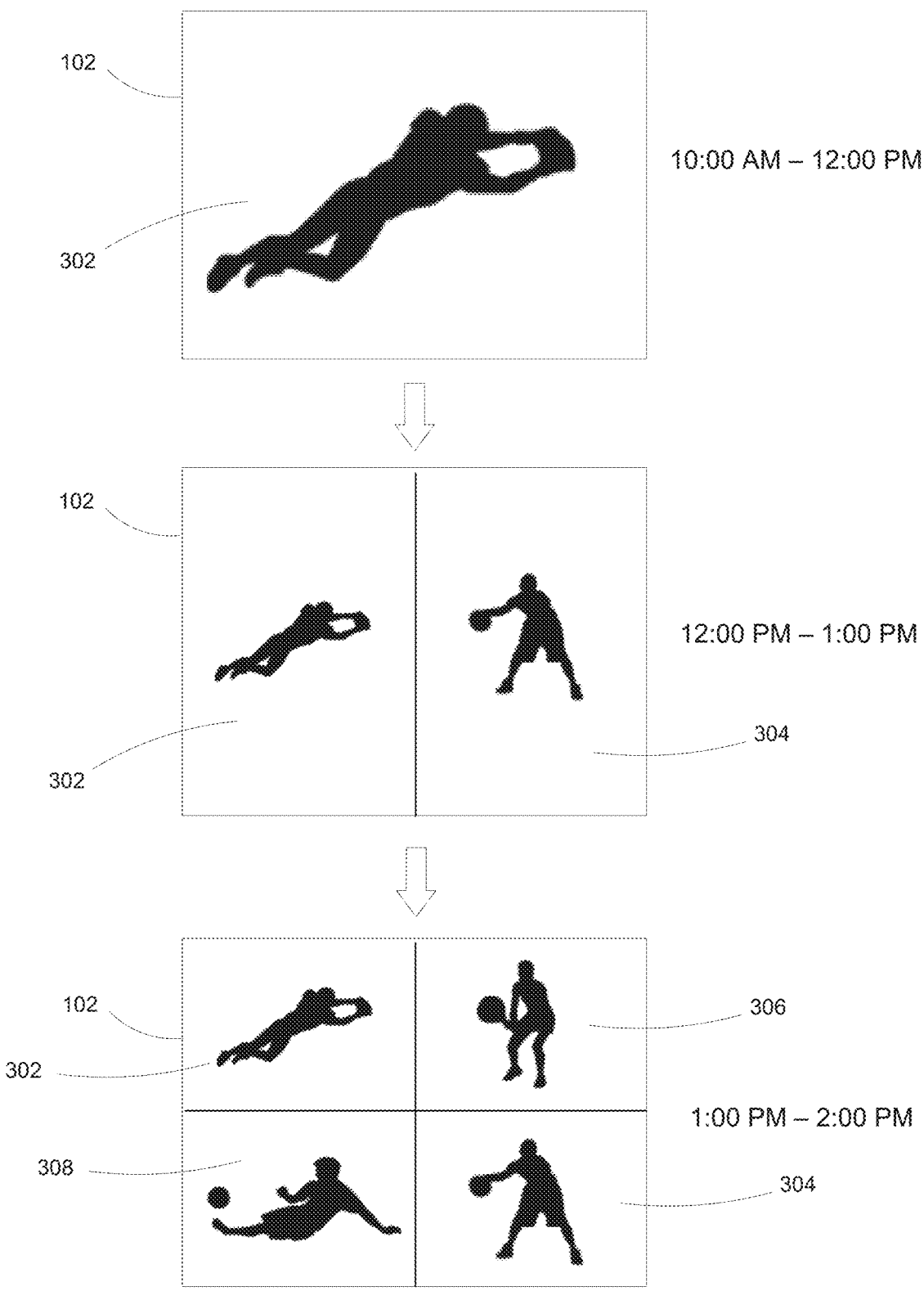
FIGS. 3A and 3B illustrate a time series of events displayed on a user device based on event broadcast availability and user wager information.

The controller 110 determines a set of live events by comparing a current time with the start time 208 and the end time 210 for each event identifier 202. If the current time is between the start and end times for an event, the event is live. The controller 110 also prioritizes the live events based on wager amount. The controller then sends instructions to the STB 104 to display the channel corresponding to each live event in order of priority. For example, as shown in FIG. 3A and with reference to table 200 of FIG. 2, from 10:00 AM to 12:00 PM, the football game 302 is the only live event being wagered on by the user. Thus, from 10:00 AM to 12:00 PM, the football game 302 is the only event displayed on television 102. From 12:00 PM to 1:00 PM, both the football game 302 and the basketball game 304 are broadcast live. Accordingly, both games are displayed on television 102. The games can be displayed as a split screen or PIP arrangement depending on the capabilities of the user equipment (e.g., STB 104 and television 102). In some implementations, the screens can be split top and bottom or left and right with the higher priority game (i.e., highest bet: football) being displayed on the top or the left, respectively. From 1:00 PM to 2:00 PM, there are five games being broadcast live. In the depicted example, the user equipment (i.e., STB 104) is capable of providing a quad video stream to display a four-way split screen. Accordingly, the lowest priority game (i.e., golf) is not displayed until the football game 302 ends at 2:00 PM. However, the golf match can be recorded for later viewing. The four highest priority live games (football 302, tennis 306, soccer 308, and basketball 304) are displayed in order of priority from top-left to lower-right quadrants.

Figure 3B:
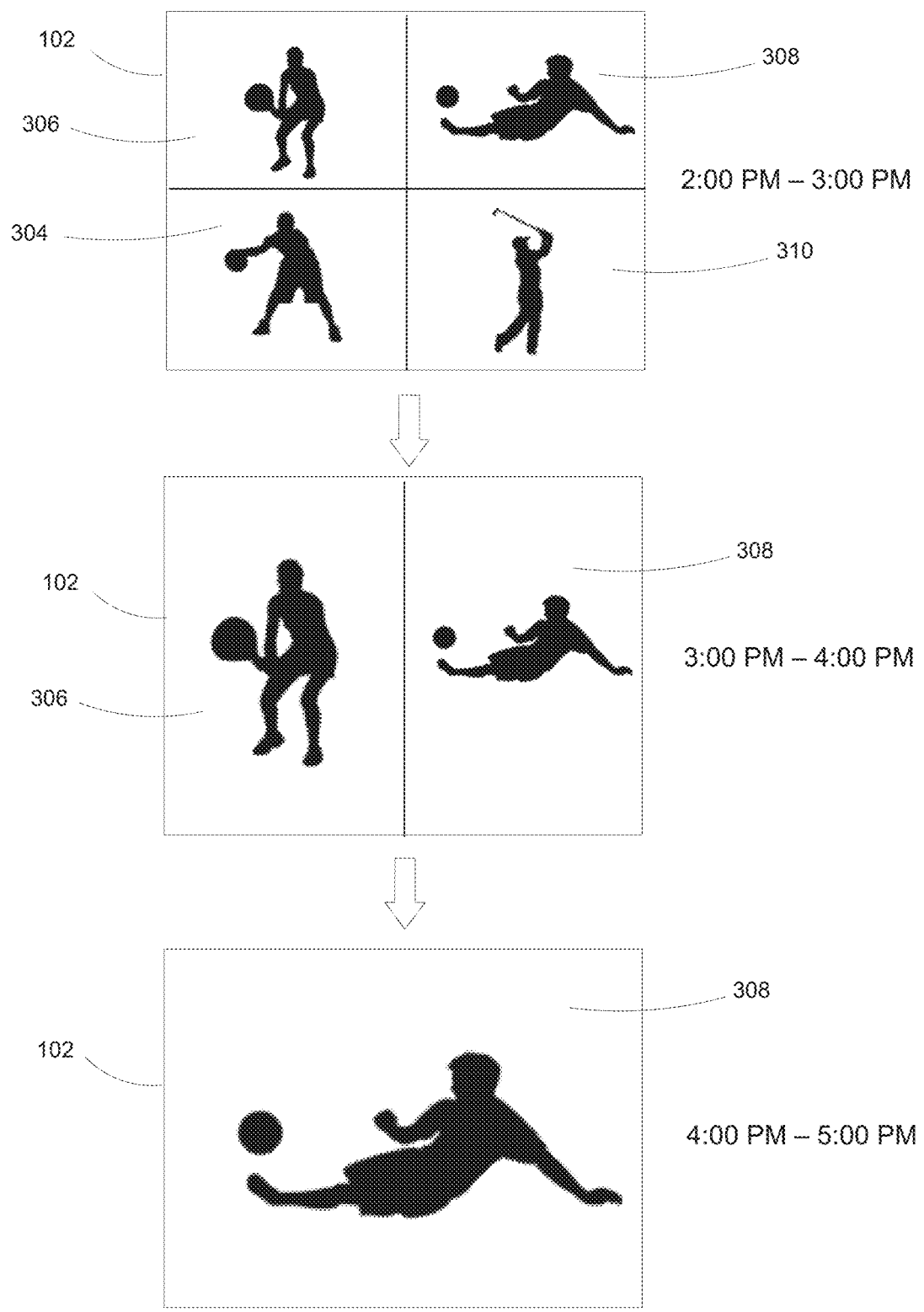

As shown in FIG. 3B, once the football game 302 ends, the tennis match 306, soccer game 308, basketball game 304, and golf match 310 are all displayed in order of priority from 2:00 PM to 3:00 PM. As the games and matches end at 3:00 PM and 4:00 PM the live events are displayed in order of priority until only the soccer game 308 remains live from 4:00 PM to 5:00 PM. In the above described example spit screen displays, the user equipment can be instructed to output an audio signal for only the channel corresponding to the highest priority live event. For example, from 2:00 PM to 3:00 PM, the audio signal for the tennis match 306 can be output.

Figure 4:
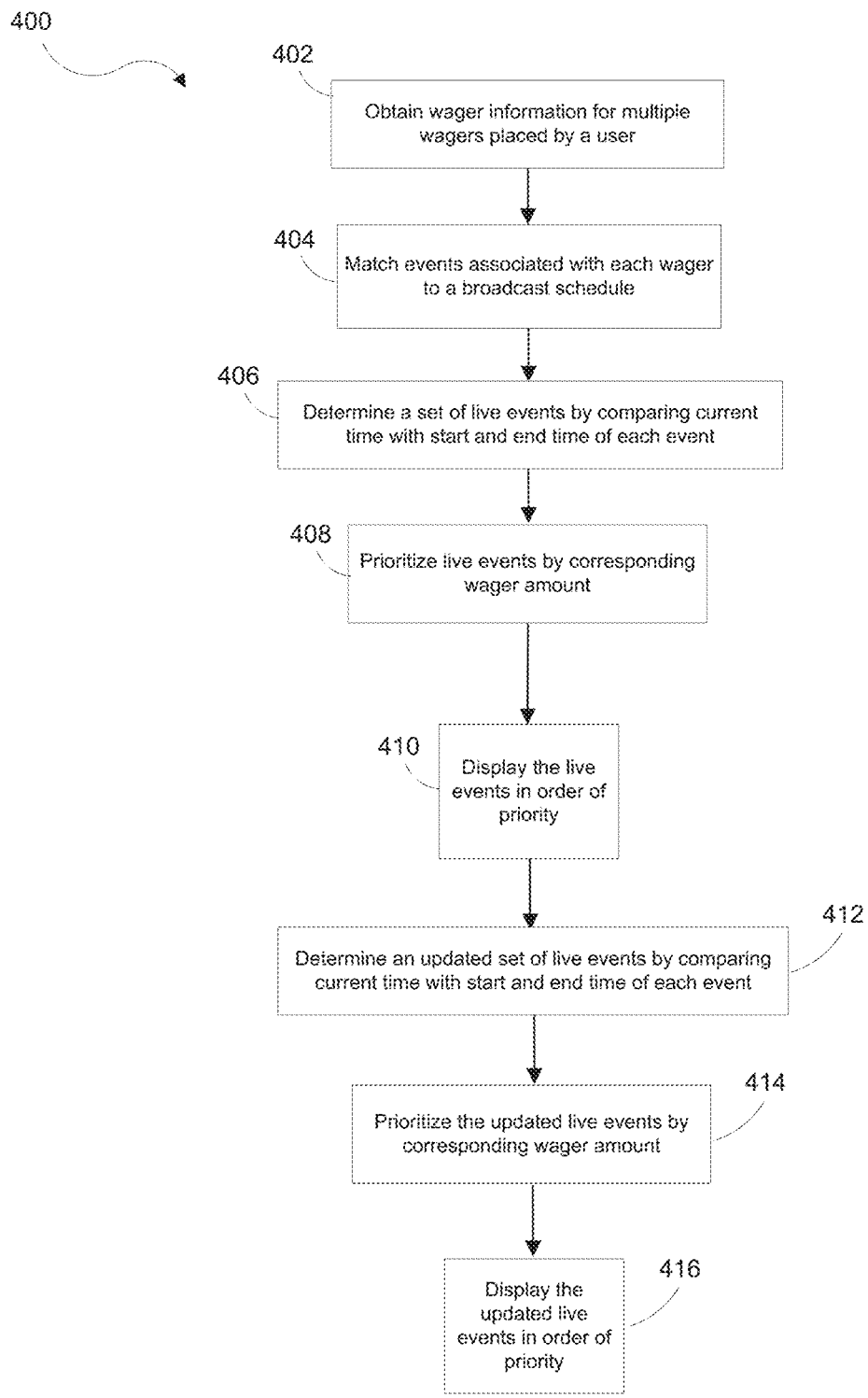
FIG. 4 illustrates an example method for prioritizing channels for display based on user wager information.

FIG. 4 is a flow diagram showing a representative method of operation 400 of a processor-based system for automatically selecting and prioritizing television channels for display based on wager information according to some embodiments of the present technology. The method starts at 402, where wager or bet information for multiple wagers placed by a user is obtained. The wager information can include, for each wager, an event identifier and a corresponding wager amount. At 404, each event identifier and corresponding wager amount are matched to a broadcast schedule. The schedule can include a channel, a start time, and an end time for each event identifier. At 406, a set of live events are determined by comparing a current time with the start time and the end time for each event identifier. At 408, the live events are prioritized based on wager amount e.g., highest wager is highest priority. At 410, the channel corresponding to each live event is displayed in order of priority. At 412, an updated set of live events is determined and at 414, the updated live events are prioritized by wager amount. At 416 the channel corresponding to each updated live event is displayed in order of priority. Steps 412, 414, and 416 can be performed periodically (e.g., every 60 seconds) or at the beginning or ending time of events being wagered on by the user. In some embodiments, the live events and priority can be predetermined in advance and provided as a schedule to the STB, for example.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 5:
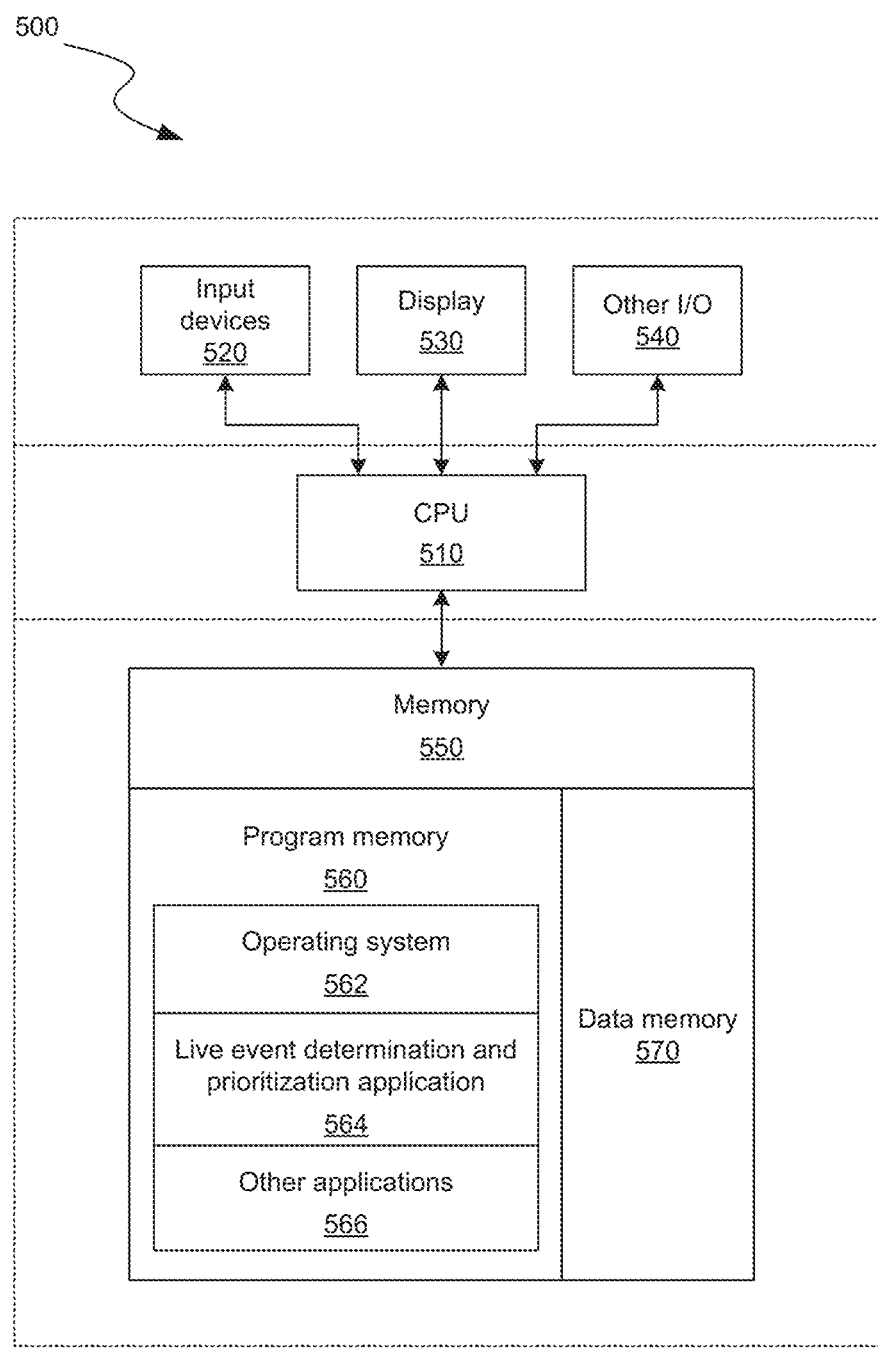
FIG. 5 is a block diagram illustrating an overview of devices on which some implementations can operate.

Several implementations are discussed below in more detail in reference to the figures. FIG. 5 is a block diagram illustrating an overview of devices on which some implementations of the disclosed technology can operate. The devices can comprise hardware components of a device 500 that determines which events are live and their priority based on wager information. Device 500 can include one or more input devices 520 that provide input to the CPU (processor) 510, notifying it of actions. The actions are typically mediated by a hardware controller that interprets the signals received from the input device and communicates the information to the CPU 510 using a communication protocol. Input devices 520 include, for example, a mouse, a keyboard, a touchscreen, an infrared sensor, a touchpad, a wearable input device, a camera- or image-based input device, a microphone, or other user input devices.

CPU 510 can be a single processing unit or multiple processing units in a device or distributed across multiple devices. CPU 510 can be coupled to other hardware devices, for example, with the use of a bus, such as a PCI bus or SCSI bus. The CPU 510 can communicate with a hardware controller for devices, such as for a display 530. Display 530 can be used to display text and graphics. In some examples, display 530 provides graphical and textual visual feedback to a user. In some implementations, display 530 includes the input device as part of the display, such as when the input device is a touchscreen or is equipped with an eye direction monitoring system. In some implementations, the display is separate from the input device. Examples of display devices are: televisions; mobile devices; an LCD display screen; an LED display screen; a projected, holographic, or augmented reality display (such as a heads-up display device or a head-mounted device); and so on. Other I/O devices 540 can also be coupled to the processor, such as a network card, video card, audio card, USB, FireWire or other external device, camera, printer, speakers, CD-ROM drive, DVD drive, disk drive, or Blu-Ray device.

In some implementations, the device 500 also includes a communication device capable of communicating wirelessly or wire-based with a network node. The communication device can communicate with another device or a server through a network using, for example, TCP/IP protocols. Device 500 can utilize the communication device to distribute operations across multiple network devices.

The CPU 510 can have access to a memory 550. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 550 can include program memory 560 that stores programs and software, such as an operating system 562, a wager information based live event determination and prioritization application 564, and other application programs 566. Memory 550 can also include data memory 570 that can include broadcast schedule information and/or wager information, etc., which can be provided to the program memory 560 or any element of the device 500.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 6:
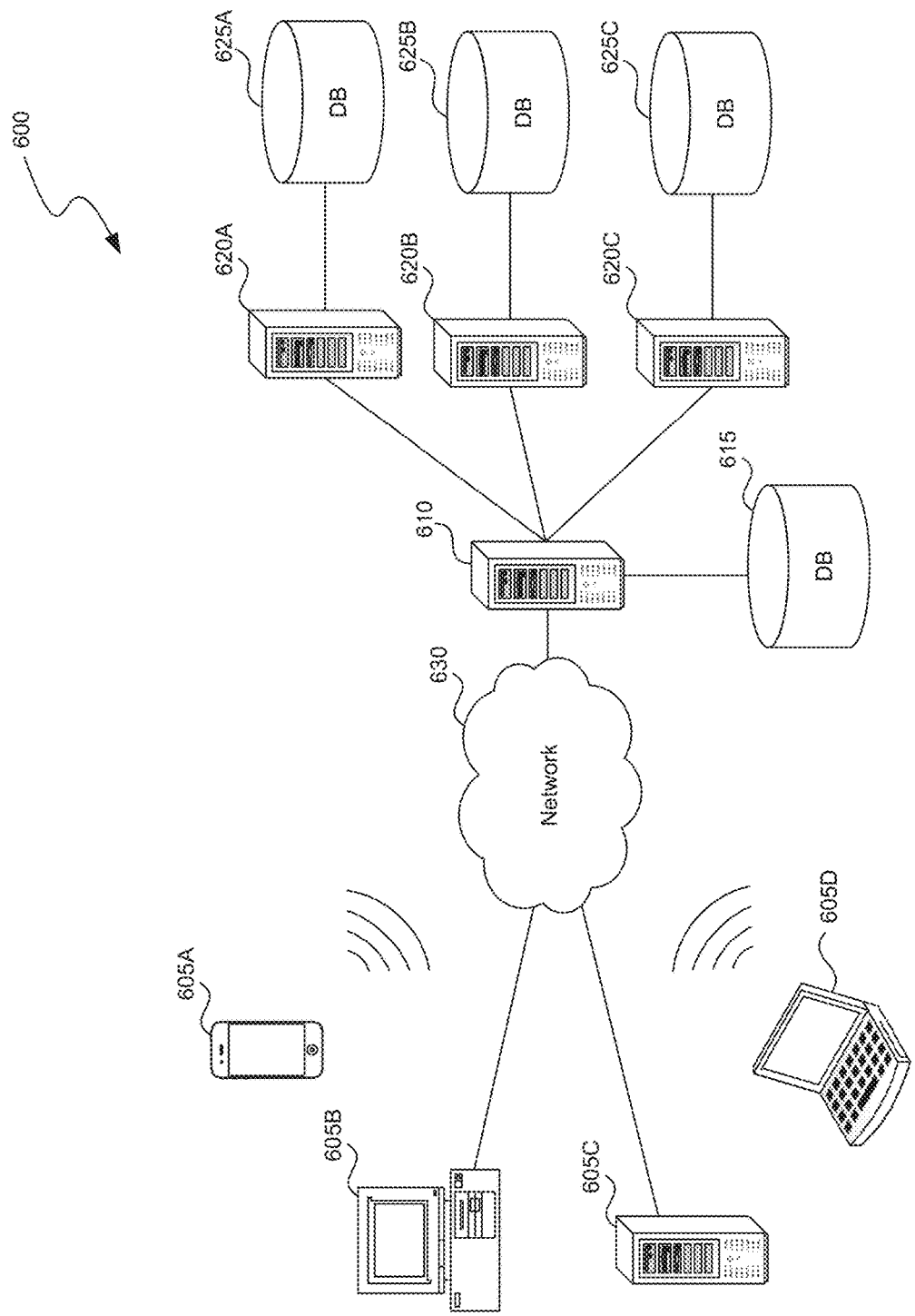
FIG. 6 is a block diagram illustrating an overview of an environment in which some implementations can operate.

FIG. 6 is a block diagram illustrating an overview of an environment 600 in which some implementations of the disclosed technology can operate. Environment 600 can include one or more client computing devices 605A-D, examples of which can include device 500. Client computing devices 605 can operate in a networked environment using logical connections through network 630 to one or more remote computers, such as a server computing device 610.

In some implementations, server computing device 610 can be an edge server that receives client requests and coordinates fulfillment of those requests through other servers, such as servers 620A-C. Server computing devices 610 and 620 can comprise computing systems, such as device 500. Though each server computing device 610 and 620 is displayed logically as a single server, server computing devices can each be a distributed computing environment encompassing multiple computing devices located at the same or at geographically disparate physical locations. In some implementations, each server computing device 620 corresponds to a group of servers.

Client computing devices 605 and server computing devices 610 and 620 can each act as a server or client to other server/client devices. Server 610 can connect to a database 615. Servers 620A-C can each connect to a corresponding database 625A-C. As discussed above, each server 620 can correspond to a group of servers, and each of these servers can share a database or can have their own database. Databases 615 and 625 can warehouse (e.g., store) information such as selected region information, a particular latitude and longitude location information, resulting risk scores, pricing/risk ratios, and/or user preferences. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN) or a wide area network (WAN), but can also be other wired or wireless networks. Network 630 may be the Internet or some other public or private network. Client computing devices 605 can be connected to network 630 through a network interface, such as by wired or wireless communication. While the connections between server 610 and servers 620 are shown as separate connections, these connections can be any kind of local, wide area, wired, or wireless network, including network 630 or a separate public or private network.

Figure 7:
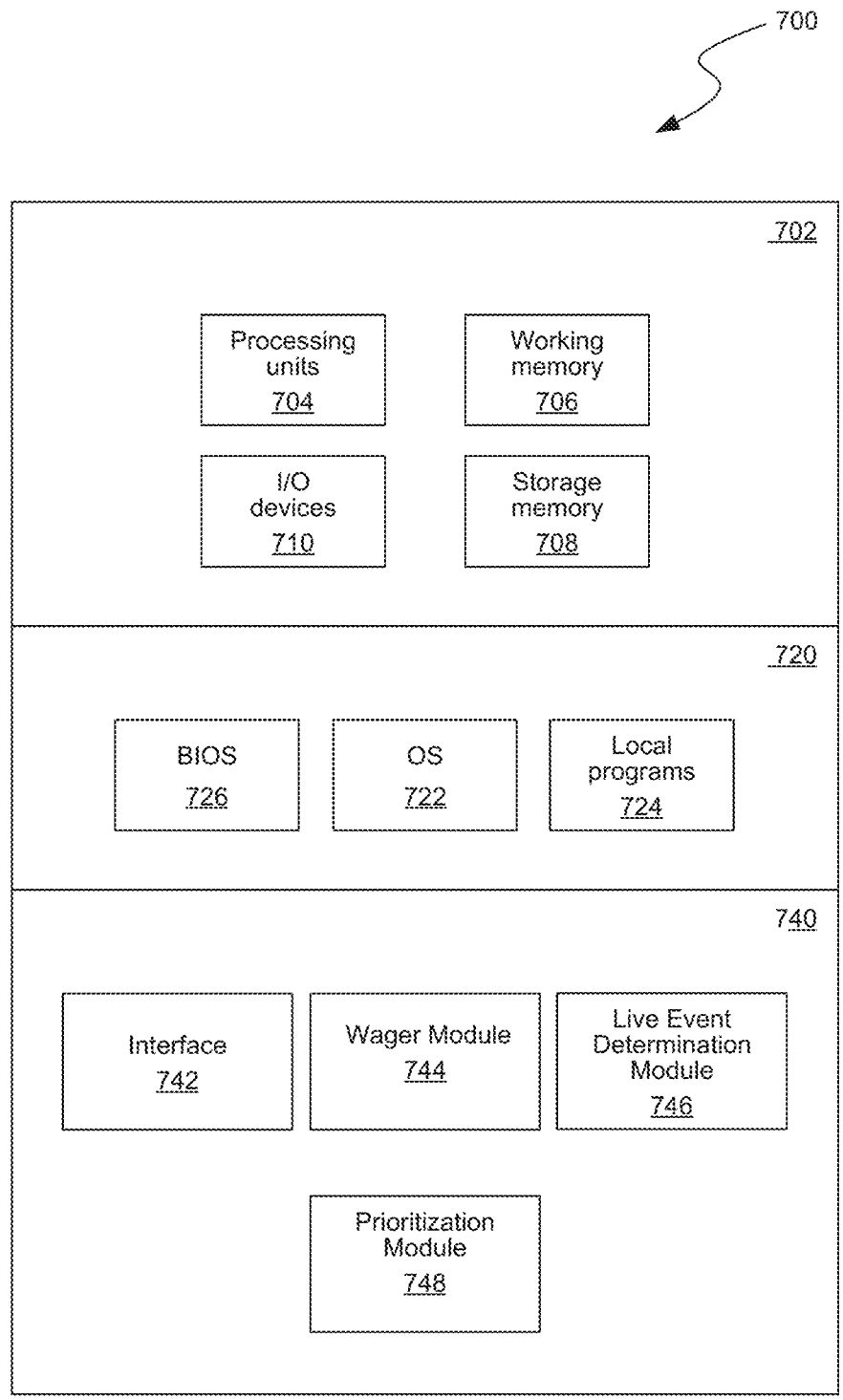
FIG. 7 is a block diagram illustrating components which, in some implementations, can be used in a system employing the disclosed technology.

FIG. 7 is a block diagram illustrating components 700 which, in some implementations, can be used in a system employing the disclosed technology. The components 700 include hardware 702, general software 720, and specialized components 740. As discussed above, a system implementing the disclosed technology can use various hardware, including processing units 704 (e.g., CPUs, GPUs, APUs, etc.), working memory 706, storage memory 708, and input and output devices 710. Components 700 can be implemented in a client computing device such as client computing devices 605 or on a server computing device, such as server computing device 610 or 620.

General software 720 can include various applications, including an operating system 722, local programs 724, and a basic input output system (BIOS) 726. Specialized components 740 can be subcomponents of a general software application 720, such as local programs 724. Specialized components 740 can include a Wager Module 744, Live Event Determination Module 746, Prioritization Module 748, and components that can be used for transferring data and controlling the specialized components, such as interface 742. In some implementations, components 700 can be in a computing system that is distributed across multiple computing devices or can be an interface to a server-based application executing one or more of specialized components 740.

Those skilled in the art will appreciate that the components illustrated in FIGS. 5-7 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

Remarks

The above description and drawings are illustrative and are not to be construed as limiting. Numerous specific details are described to provide a thorough understanding of the disclosure. However, in some instances, well-known details are not described in order to avoid obscuring the description.

Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for automatically selecting television channels for display based on bet information, the method comprising:
    determining, by a controller, a set of live broadcast events by comparing a current time with a start time and an end time for each of a plurality of broadcast events;
    prioritizing, by the controller, the available live broadcast events based on a bet amount associated with each of the available live broadcast events; and
    sending, by the controller, an instruction to display a channel corresponding to each available live broadcast event in order of priority.

2. The method of claim 1, further comprising determining an updated set of live broadcast events, prioritizing the updated live broadcast events by bet amount, and sending a subsequent instruction to display the channel corresponding to each updated live broadcast event in order of priority.

3. The method of claim 1, further comprising displaying the live broadcast events in order of priority on one or more display devices.

4. The method of claim 1, further comprising outputting a quad video stream that comprises the four channels corresponding to each of the four highest priority live broadcast events for display on four quadrants of a display device.

5. The method of claim 4, wherein the four channels are displayed in order of priority from a top-left to a lower-right quadrant.

6. The method of claim 1, further comprising sending an instruction to output an audio signal for only the channel corresponding to the highest priority live broadcast event.

7. The method of claim 1, wherein the bet amount for each of the available live broadcast events is obtained from bet information for one or more bets placed by a viewer.

8. The method of claim 7, wherein the bet information is obtained via a viewer device.

9. The method of claim 7, wherein the bet information is obtained via one or more third party betting platforms.

10. The method of claim 7, wherein the bet information is obtained via a set-top box of the viewer.

11. A system for automatically selecting television channels for display based on bet information, the system comprising:
    a set-top box associated with a display device;
    one or more bet databases having bet information for one or more bets placed by at least one viewer, the bet information including, for each bet, an event identifier and a corresponding bet amount;
    one or more broadcast databases having broadcast schedule information including a channel, a start time, and an end time for each event identifier; and
    a controller, comprising:
        one or more processors; and
        one or more memory devices having stored thereon instructions that when executed by the one or more processors cause the one or more processors to:
            determine a set of live broadcast events by comparing a current time with the start time and the end time for each event identifier;
            prioritize the live broadcast events based on bet; and
            send an instruction to the set-top box to display the channel corresponding to each live broadcast event in order of priority.

12. The system of claim 11, wherein the one or more memory devices have stored thereon further instructions that, when executed by the one or more processors, cause the one or more processors to determine an updated set of live broadcast events, prioritize the updated live broadcast events by bet amount, and send a subsequent instruction to the set-top box to display the channel corresponding to each updated live broadcast event in order of priority.

13. The system of claim 11, wherein the one or more memory devices have stored thereon further instructions that, when executed by the one or more processors, cause the one or more processors to send an instruction to the set-top box to output a quad video stream that comprises the four channels corresponding to each of the four highest priority live broadcast events for display on four quadrants of the display device.

14. The system of claim 11, wherein the one or more memory devices have stored thereon further instructions that, when executed by the one or more processors, cause the one or more processors to send an instruction to the set-top box to output an audio signal for only the channel corresponding to the highest priority live broadcast event.

15. The system of claim 11, wherein the bet information is obtained via a viewer device.

16. The system of claim 11, wherein the bet information is obtained via one or more third party betting platforms.

17. A non-transitory processor readable memory device, comprising instructions stored thereon that when executed by one or more processors, cause the one or more processors to:

determine a set of available live broadcast events by comparing a current time with a start time and an end time for each of a plurality of broadcast events;

prioritize the available live broadcast events based on a bet amount associated with the each of the available live broadcast events; and send an instruction to display the channel corresponding to each available live broadcast event in order of priority.

18. The no memory device of claim 17, wherein the processor readable memory device has stored thereon further instructions that, when executed by the one or more processors, cause the one or more processors to determine an updated set of live broadcast events, prioritize the updated live broadcast events by bet amount, and send a subsequent instruction to display the channel corresponding to each updated live broadcast event in order of priority.

19. The non-transitory memory device of claim 17, wherein the processor readable memory device has stored thereon further instructions that, when executed by the one or more processors, cause the one or more processors to output a quad video stream that comprises the four channels corresponding to each of the four highest priority live broadcast events for display on four quadrants of a display device.

20. The non-transitory memory device of claim 19, wherein the processor readable memory device has stored thereon further instructions that, when executed by the one or more processors, cause the one or more processors to send an instruction to output an audio signal for only the channel corresponding to the highest priority live broadcast event.

* * * * *

UNITED STATES PATENT AND TRADEMARK OFFICE
CERTIFICATE OF CORRECTION

PATENT NO. : 11,290,790 B2
APPLICATION NO. : 17/100563
DATED : March 29, 2022
INVENTOR(S) : Eric Pleiman It is certified that error appears in the above-identified patent and that said Letters Patent is hereby corrected as shown below:

In the Claims

Claim 11, Column 10, Line 32, after "bet" please insert --amount--.
Claim 18, Column 11, Line 10, delete "no" and insert --non-transitory--.

Signed and Sealed this
Tenth Day of May, 2022

Katherine Kelly Vidal
*Director of the United States Patent and Trademark Office*